Oct. 13, 1959     L. B. ROSS     2,908,131
COMBINATION REVERSABLE RAKE AND GARDEN IMPLEMENT
Filed April 28, 1958
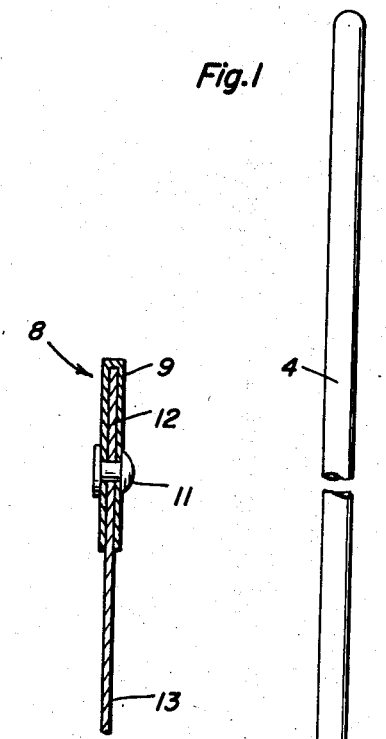
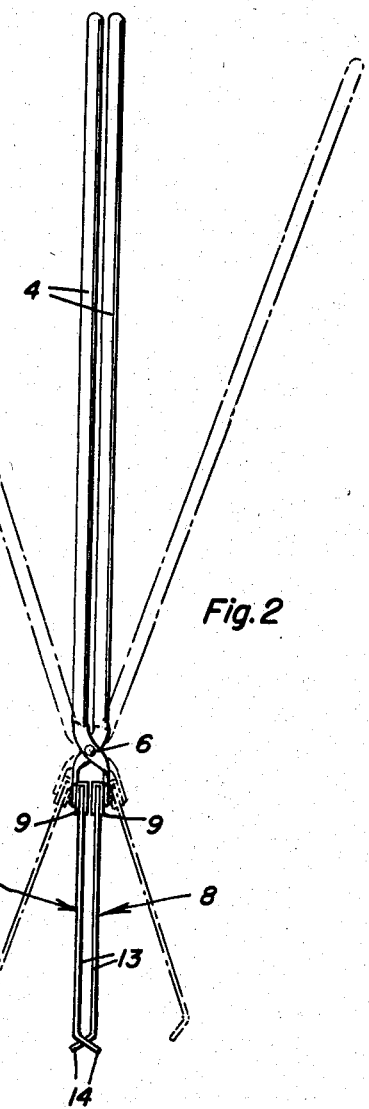
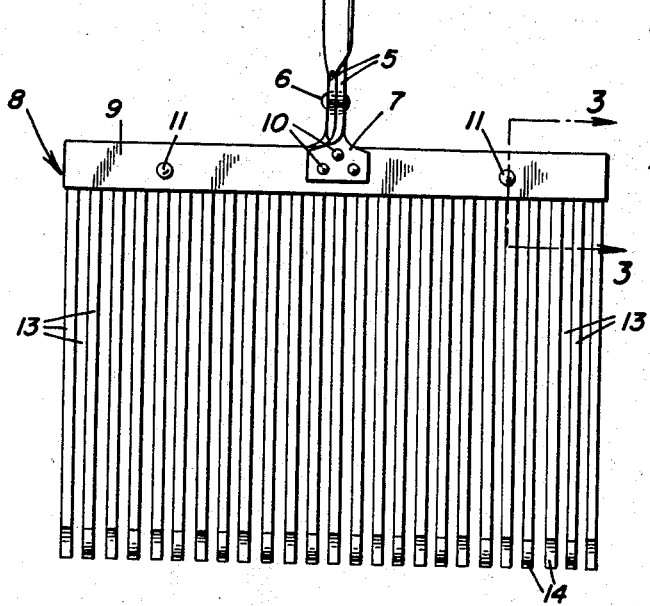
Lofton B. Ross
INVENTOR.

United States Patent Office 2,908,131
Patented Oct. 13, 1959

---

2,908,131

COMBINATION REVERSABLE RAKE AND GARDEN IMPLEMENT

Lofton B. Ross, Los Angeles, Calif.

Application April 28, 1958, Serial No. 731,238

2 Claims. (Cl. 56—400.04)

The present invention relates to new and useful improvements in garden or lawn implements and has for its primary object to provide, in a manner as hereinafter set forth, a device of this character which may be readily used either as a rake or a pickup tool.

Another very important object of the present invention is to provide a combination implement of the aforementioned character which eliminates the necessity of stooping or bending.

Other objects of the invention are to provide a combination garden or lawn rake and pickup tool which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in front elevation of a combination implement or tool constructed in accordance with the present invention;

Figure 2 is a view in side elevation of the device taken on a reduced scale; and Figure 3 is an enlarged view in transverse section through the upper portion of one of the heads, taken substantially on the line 3—3 of Figure 1.

Referring now to the drawing in detail, it will be seen that the embodiment of the invention which has been illustrated comprises a pair of elongated tubular handles 4 of suitable material, preferably aluminum. The handles 4, which may also be of any desired length and diameter, comprise flattened, crossed lower end portions 5 which are pivotally connected as at 6 and which terminate in quarter twisted apertured plates 7.

Mounted on the lower end portions of the handles 4 are heads 8. The heads 8 include metallic bars 9 of substantially U-shaped cross-section which are secured, as at 10, on the plates 7. Secured at 11 in the bars 9 are plates 12 of suitable resilient sheet metal. Formed integrally with the plates 12 are depending teeth or fingers 13. The teeth or fingers 13 of the heads 8 are relatively staggered and terminate in angularly bent, interleaving free end portions 14.

It is thought that the use of the implement will be readily apparent from a consideration of the foregoing. Briefly, by holding the handles 4 together or in closed position, as shown, the heads 8 may be pulled or swept over the ground for the purpose of raking. Either side or face of the implement may be thus used. That is, the device is reversible. To use the device as a pickup tool, the handles 4 are opened or swung away from each other thereby opening the heads 8 as shown in broken lines in Figure 2 of the drawing. The handles 4 are then swung toward each other for closing the heads 8, the fingers 13 gripping and retaining therebetween leaves, trash, etc., in an obvious manner.

The foregoing is considered as illustrative only of the principles of the invention. Further, since numerous modifications and changes will readily occur to those skilled in the art, it is not desired to limit the invention to the exact construction and operation showed and described, and accordingly, all suitable modifications and equivalents may be resorted to, falling within the scope of the invention as claimed.

What is claimed as new is as follows:

1. A combination garden implement comprising: a pair of elongated handles crossed and pivotally connected at one end and extending, when in a closed position, in close parallelism with each other, metallic bars of substantially U-shaped transverse section affixed transversely on the pivotally connected end portions of the handles, plates of resilient metal secured in said bars, and resilient fingers integral with said plates and depending therefrom, the fingers of the respective plates being relatively staggered and including oppositely angularly bent interleaving free end portions providing a reversible rake when the handles parallel each other, said handles, when in parallelism, forming a single handle for said reversible rake.

2. A combination garden implement comprising: a pair of elongated tubular handles including flattened, crossed and pivotally connected end portions and extending, when in a closed position, in close parallelism with each other, plates integral with the pivotally connected end portions of said handles, metallic bars of substantially U-shaped cross-section affixed to said plates, plates of resilient metal secured in said bars, and resilient fingers integral with the second named plates and depending therefrom, the fingers of the respective second named plates being relatively staggered and including oppositely angularly bent, interleaving free end portions providing a reversible rake when the handles parallel each other, said handles, when in parallelism, forming a single handle for said reversible rake.

References Cited in the file of this patent

UNITED STATES PATENTS

| | | |
|---|---|---|
| 1,160,282 | Harris et al. | Nov. 16, 1915 |
| 2,136,849 | Hembree | Nov. 15, 1938 |
| 2,504,943 | Zifferer | Apr. 18, 1950 |

OTHER REFERENCES

Popular Science, February 1950, page 157, 56–400.04. (Article on double rake.)